United States Patent Office 2,955,340
Patented Oct. 11, 1960

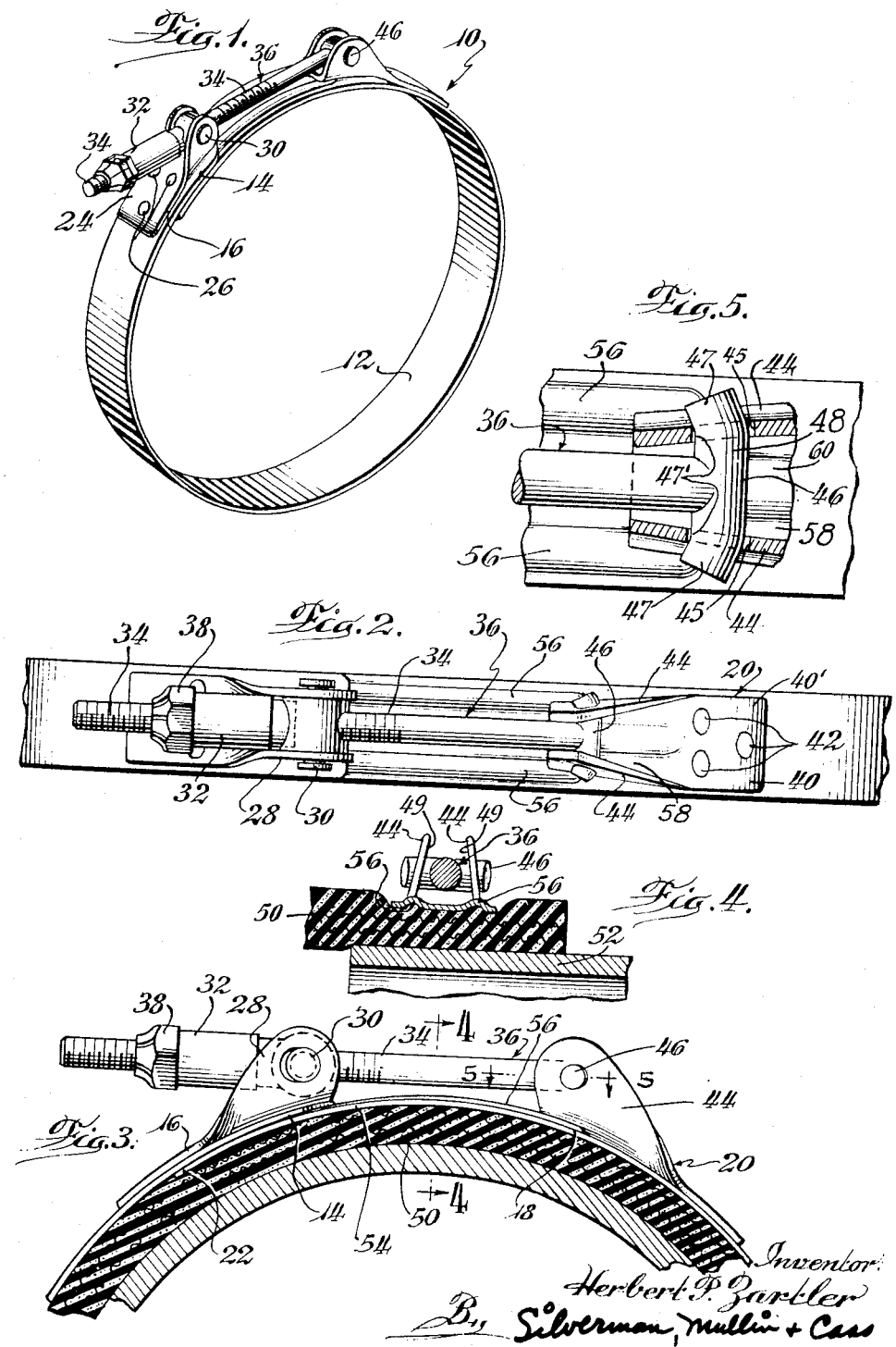

2,955,340

HOSE CLAMP CONSTRUCTION

Herbert P. Zartler, Hillside, Ill., assignor to Wittek Manufacturing Co., Chicago, Ill., a corporation of Illinois Filed Dec. 17, 1957, Ser. No. 703,444

4 Claims. (Cl. 24—279)

This invention relates generally to hose clamps employing a variable length connector member connected between separable ends of a flexible band or strap and more particularly, relates to improvements in the construction of a said connector member to achieve materially greater strength and freedom from distortion in the installation thereof under even extreme tension conditions in which the connector member may be placed.

Generally, hose clamps of the type with which this invention is concerned have been known to employ a flexible metal band or strap having free ends and a T-bolt as such a connector member connected to enable said free ends to be drawn together thereby reducing the diameter of the band and tightly engaging same around a pair of coupled conduits, such as a flexible hose telescoped over a more rigid conduit such as a pipe or tube. Upon such tightening, tension is applied to the band. Various structures for connecting the tightening bolt have heretofore been employed, one such structure is embodied in a quick release hose clamp of the type described and claimed in my U.S. Patent No. 2,724,885. In this patented hose clamp, the T-portion of the bolt was releasably engaged in a bolt retainer termed a coupler member which permitted withdrawal of said T-portion. This invention will be described as applicable to the type of connecting structure for the tightening bolt in which the T-portion of the bolt is permanently connected with the bolt retainer, but the invention herein is not so to be limited. The use of the invention in a quick release hose clamp is shown in my copending application Serial No. 703,442, filed December 17, 1957, now Patent No. 2,900,698, dated August 25, 1959, and entitled Quick Acting Hose Clamp.

It has been known to provide a bolt retainer formation for the T-segment of the tightening bolt which included a base portion and a pair of laterally spaced ears upstanding on said base, said ears having aligned apertures in which the opposite ends of T-segment were engaged. There thus were portions of the ears presented edgewise to the T-segment. Said retainer formation was rigidly secured on one of the free ends of the band and the tightening bolt was connected to a journal formation on the other free end of the band. As the clamp was tightened, the tightening bolt was placed under tension and under conditions of extreme tension, as occasioned when the clamp is fully tightened, there was some tendency for the ears of the bolt retainer formation to be distorted, such as by spreading one relative the other. As a result, sufficient spreading could result in the T-end of the bolt being shifted laterally relative the second free end of the band with accompanying twisting of the band. Also, the T-segment could be withdrawn from its engagement between the apertured ears thereby unlocking the clamp. The primary object of this invention is to provide a hose clamp of the character described in which such tendency for the said ears of the retainer member to spread is positively prevented by means of a novel structure employed for the tightening bolt.

Another object of the invention is to provide a hose clamp of the character described in which the tightening bolt comprises a T-bolt and the T-segment or cross-arm thereof has means engaged with the laterally spaced ears of the bolt retainer positively to prevent any tendency of the ears to spread one relative the other even when the bolt is under extreme tension.

A further object of the invention is to provide a hose clamp of the character described in which said means comprise the extremities of said T-segment of the bolt being offset relative the medial portion thereof between said ears, said offset portions being engaged in the apertures and offset in the same direction to provide hook formations engageable with the edgewise portions of said apertures against which force is applied by the T-segment during tightening of the bolt whereby said offset extremities prevent or limit spreading of said ears under extreme tension conditions.

Another object of the invention is to provide a hose clamp of the character described in which the bolt retainer for T-end of the tightening bolt is a metal stamping having a base portion for rigidly securing said bolt retainer on an end of the band, said band has an extender portion, and said base portion has means for properly positioning same on the extender relative the trunnion retainer of the clamp and said means further are adapted to be cooperatively engaged with said extender to prevent lateral shifting or twisting of said bolt retainer relative the extender.

The foregoing and other objects of the invention will become apparent from the ensuing description in which a preferred embodiment has been set forth in detail and illustrated in the accompanying drawing. Minor variations in structural details may occur to the skilled artisan without sacrificing any of the advantages or departing from the scope of the invention.

In the drawings:

Fig. 1 is a perspective view of a hose clamp of the general type with which the invention is concerned, and in which the advantageous structure for the connecting bolt or screw and the retainer member therefor is embodied.

Fig. 2 is an enlarged top plan view of the said hose clamp.

Fig. 3 is a side elevational view of the hose clamp installed surrounding a flexible hose telescoped over a more rigid conduit, the latter two shown in section.

Fig. 4 is a sectional view taken along the line 4—4 of Fig. 3 in the general direction indicated.

Fig. 5 is a partial sectional view taken through the hose clamp along the line 5—5 of Fig. 3 and in the direction indicated.

As seen in Fig. 1, the clamp 10 has a circular metal strap or band 12 formed as a loop with separable ends, one end 14 having a trunnion retainer member 16 rigidly mounted thereon, and the second effective end 18 has a tightening bolt retainer member 20 mounted thereon. The end 14 is one actual physical end of the band 12 whereas the end 18 is the effective end thereof which is spaced from the actual second physical end 22 of the band resulting in an extender portion 54 the purpose of which will be explained subsequently herein.

Trunnion retainer member 16 preferably is formed as a metal stamping in which there is provided a flat base portion 24 arcuately formed along its length to enable securement thereof overlying the band, as by spot welding 26 and a pair of laterally spaced relatively parallel ears 28 upstanding from said base 24. A trunnion 30 is supported between said ears in suitably aligned apertures provided in the ears. The trunnion 30 is supported between said ears by reduced dimension extremities and has a bushing or stem 32 connected therewith, either permanently or seated in an appropriate socket provided in the trunnion. Said trunnion is centrally bored, as is the bushing 32, to provide a passageway therethrough extending transverse to the axis of rotation of the trunnion. Extending through trunnion 30 and bushing 32 is the shank 34 of an elongate T-bolt 36 with the threaded end of the shank engaged by the nut 38. T-bolt 36 is constructed in accordance with the principles of the herein invention as will be described subsequently.

The bolt retainer 20 is formed in accordance with this invention as an integral metal stamping having an elongate, flat base portion 40 arcuately curved in the length thereof complementary to the curvature of the band end on which same is mounted. Said flat base 40 is spot-welded as to 42 to the metal strap 12 only at the right end thereof. Upstanding from said base 40 is a pair of generally parallel ears 44 each provided with an aperture 45 (Fig. 5), said apertures being coaxially aligned spaced above the base 40 for permanent connection therewith of the T-end 46 of bolt 36. Said end 46 of the bolt is characterized as the T-end of the bolt 36 only for purposes of more definitely locating the improvements afforded by this invention.

In the ordinary T-shaped end of such a tightening bolt, the cross-arm was straight throughout the length thereof and the ends of said cross-arm were received in apertures, such as 45. Upon tightening of the connecting bolt or screw, the edges of the apertures 45 in closest proximity to the trunnion retainer 16 as well as the extremities of the cross-arm were subjected to considerable forces which under extreme tension of the connecting bolt tended to cause the relatively weaker ears 44 to spread. Since the length of the cross-arm could not be unduly greater than the linear distance between external surfaces of said ears 44, sufficient spreading could and did result such that the connecting bolt could be pulled out from between the ears 44, with disastrous results. This invention provides means for positively preventing spreading of ears 44 even under such extreme tension conditions.

Referring to Fig. 5, each of the ends 47 of the T-end 46 is offset from the medial portion 48, said offset ends being inserted in the apertures 45 with medial portion 48 arranged between the facing inner surfaces 49 of said ears (Fig. 4). As seen in Fig. 2, said ends 47 are offset inwardly, that is, to the left toward the trunnion 30 and hence may be considered closer to the trunnion 30 than is said medial portion 48. Said offset ends may be likened to hook formations on the ends of the T.

In use, band 12 encircles a hose 50 which in turn is engaged upon a conduit or pipe 52. To tighten clamp 10, nut 38 is taken up to decrease the distance between ears 28 and 44 with resulting application of tension through shank 34 between trunnion 30 and the T-end of the bolt. The offset extremities 47 bear against the adjacent edges of apertures 45, but since they are offset in the direction in which they bear against said edges, any tendency of the ears 44 to spread is prevented by the portions 47 tending to straighten. In other words, the extremities 47 would be required to bend in the direction opposite to that in which they are offset normally and thereby prevent the ears 44 from spreading apart even under extreme tension conditions. Since the bolt end is much stronger than the ears 44, this is unlikely to happen and hence spreading of the ears is prevented or at least limited to the distance between bends of the hook-like formations, i.e., the inner corners thereof identified as 47'. Hook extremities 47 may be formed by suitable crimping, bending, peaning, swaging or the like apparatus.

As explained in my co-pending application, Serial No. 703,403, filed December 17, 1957, for Hose Clamp Band, when the entire band is under tension, there is provided an extender portion 54 between the effective end 18 and the end 22 which is not so tensed, but instead, is under compression, sometimes digging into hose 50 as the diameter of the band decreases. Upset or stamped into the extender 54 are ribs 56 which stiffen the extender and resist outward bowing thereof as explained in said application. Said ribs 56 are seen in Fig. 2 as a pair laterally spaced apart on extender 54. In forming the retainer member 20 of this invention, preferably same is formed as a metal stamping with the ears 44 apertured during the stamping operation. The blank is folded with the apertured ears receiving the offset extremities 47 which have been previously bent, crimped, swaged or the like. There is achieved an assembly of the retainer 20 and the tightening bolt which thereafter can be mounted as a unit on extender 54. However, the base portion 58 between the ears 44 purposely is made sufficiently narrow so that same may be close-fitted between the ribs 56 and thus, the portion 58 functions as a guide or positioning means for the bolt retainer 20 so that when installed, same will be aligned properly relative trunnion retainer 18. Also, the upstanding ribs 56 prevent lateral shifting or twisting of the retainer 20. In addition, as seen in Fig. 5, said portion 58 is provided with a longitudinal rib 60 upset or stamped into said portion 58, said rib 60 serving to strengthen said base portion 58. It will be noted that portion 40' of retainer base is attached by welds 42 and same is wider than and to the right of portion 58.

It is believed the invention has been sufficiently described to enable the skilled artisan to understand and practice the same. Variations are contemplated without departure from the principles of the invention as set forth in the claims hereto appended.

I claim:

1. A hose clamp comprising a looped flexible metal band adapted to encircle a hose and having a pair of separable ends, trunnion means on one end and a retainer member on the other end, a T-bolt having its shank engaged with said trunnion means and its cross arm engaged with said retainer member to couple the separable ends and said bolt being provided with a nut to enable taking up on the shank effectively to shorten the T-bolt thereby decreasing the diameter of the band loop, the retainer member including a pair of laterally spaced upstanding ears each having an aperture and the apertures being aligned on an axis substantially perpendicular to said shank, the cross arm being supported between said ears and having angular formations on opposite ends thereof engaged in the respective apertures and directed toward the shank side of said cross arm and each forming with said shank an angle less than 90° so that tension applied to the shank of said T-bolt in closing said band loop upon a hose will apply a force against said ears opposing spreading of the same.

2. A hose clamp as claimed in claim 1 in which said angular formations of said cross arm are of diameter slightly less than that of said apertures to enable assembly by passing each angular formation through the respective aperture from inside said ears.

3. In a hose clamp having a circular tension band provided with a pair of effective ends and a pair of spaced apart upstanding apertured ears mounted adjacent opposite sides of one end of the band: a variable length connector member adapted to be connected between said formations for applying tension to the band when the effective length of the connector member is shortened, said connector member comprising a substantially T-shaped elongate element having a shank part and a cross-arm, the cross-arm of the element having a medial portion substantially perpendicular to the shank part of the element, and bent formations at the ends of said medial portion arranged to project angularly toward the said shank part at less than 90° with respect to the medial portion of said cross-arm, said cross-arm adapted to be connected between said upstanding ears with the medial portion between said ears and the bent formations inserted through the respective apertures in said ears protruding from said ears to engage the apertures and apply force tending to squeeze the ears together when the connector member is shortened.

4. A hose clamp comprising a flexible metal strip having free ends and arranged in a circular loop to encircle and be constricted about a hose, an elongate connector member having its opposite ends coupled with the respective free ends whereby as the connector member is effectively shortened, the diameter of said loop will be decreased, the connector member lying in a plane which is normal to the axis of said loop and extending in a direction applying tension between said free ends along a line generally parallel with a tangent to said loop, the connector member comprising an elongate body part having a relatively short T-segment at one end thereof, a pair of upstanding flat ears carried adjacent one free end of said strip facing one another and disposed edgewise towards the second free end and each ear having an aperture formed therein, the T-segment being positioned between the said ears with the opposite end portions of said T-segment extending into the respective apertures, retaining and tensing means at the second free end of said strip for engaging said elongate body part at a point spaced from said T-segment and for taking up said elongate body part to force said T-segment to bear on the apertures' walls closest to said second free end, said opposite end portions of said T-segment being of substantially uniform diameter and being offset relative to the remainder of said T-segment toward said second free end whereby to oppose spreading of said ears while effectively shortening said connecting member, the offset end portions having generally the same configuration in cross section as the apertures but being slightly smaller in diameter to permit assembly of said T-segment and ears by bending the ears toward one another upon said offset end portions until the apertures engage said offset end portions.

References Cited in the file of this patent
UNITED STATES PATENTS

| | | |
|---|---|---|
| 1,369,851 | Swaidmark | Mar. 1, 1921 |
| 1,473,537 | Bailey | Nov. 6, 1923 |
| 1,497,549 | Conradi | Jan. 10, 1924 |
| 1,524,074 | Wolcott | Jan. 27, 1925 |
| 1,619,841 | Witwer | Mar. 8, 1927 |
| 2,278,071 | Gass | Mar. 31, 1942 |
| 2,724,885 | Zartler | Nov. 29, 1955 |
| 2,727,292 | Houghton | Dec. 20, 1955 |
| 2,806,276 | Cooper | Sept. 17, 1957 |

FOREIGN PATENTS

| | | |
|---|---|---|
| 1,559 | Great Britain | Jan. 20, 1914 |
| 394,334 | Great Britain | June 21, 1933 |